(Model.)
J. GILLESPIE.
ODOMETER.
No. 290,767. Patented Dec. 25, 1883.
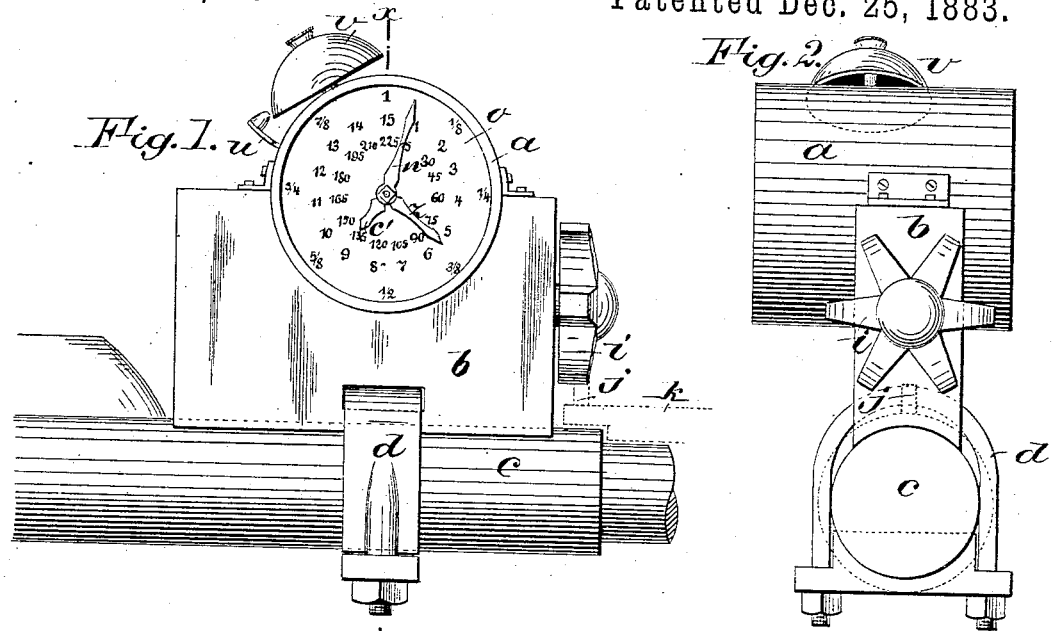
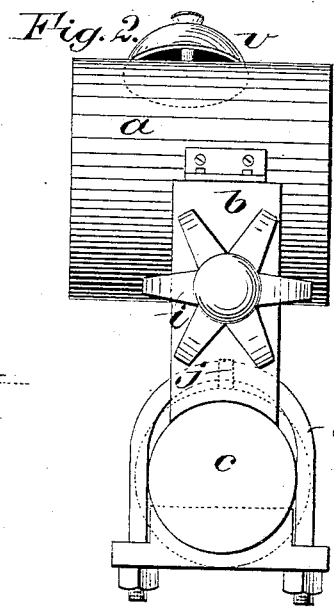
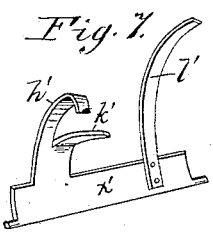
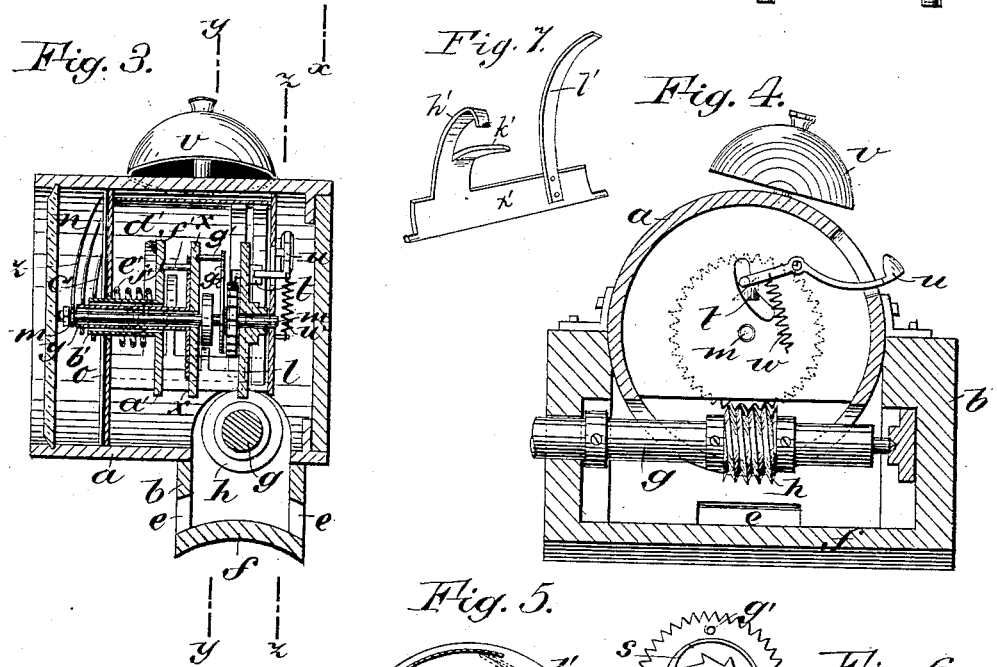
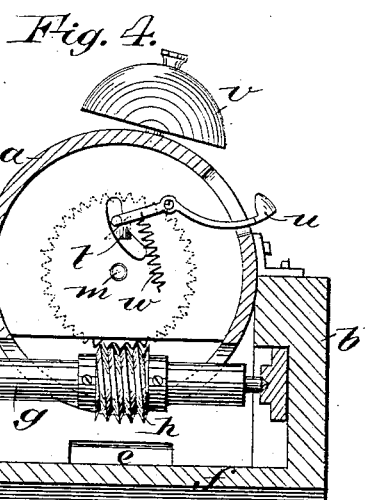
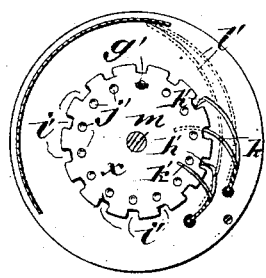
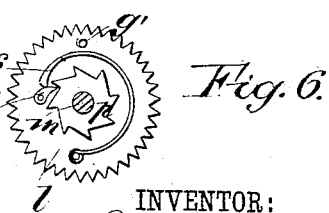
WITNESSES:
INVENTOR:
J. Gillespie
BY Munn & Co
ATTORNEYS.

UNITED STATES PATENT OFFICE.

JAMES GILLESPIE, OF WEST POINT, OHIO.

ODOMETER.

SPECIFICATION forming part of Letters Patent No. 290,767, dated December 25, 1883.

Application filed October 8, 1883. (Model.)

*To all whom it may concern:*

Be it known that I, JAMES GILLESPIE, of West Point, in the county of Columbiana and State of Ohio, have invented a new and Improved Odometer, of which the following is a full, clear, and exact description.

The object of the invention is to improve odometers by means hereinafter described, and pointed out in the claims.

Reference is to be had to the accompanying drawings, forming part of this specification, in which similar letters of reference indicate corresponding parts in all the figures.

Figure 1 is a side elevation of my improved odometer, as seen looking from behind the vehicle. Fig. 2 is an elevation as seen looking to the side of the vehicle. Fig. 3 is a section on line $x\ x$ of Fig. 1. Fig. 4 is a section on line $z\ z$ of Fig. 3. Fig. 5 is a section on line $y\ y$ of Fig. 3, and Fig. 6 is a side elevation of the unit-wheel. Fig. 7 is a view showing the local relation of certain pawls, $h'\ k'$, and springs $l'$, hereinafter described.

I provide a hollow cylindrical case, $a$, for containing the counting and recording mechanism, which is mounted on a hollow base, $b$, the lengthwise direction of which ranges transversely to the case $a$ and along the axle $c$, whereon it is fitted to rest as a saddle for the support of the apparatus, the said base being secured to the axle by a clip, $d$, fitted through slots $e$ of the sides of the base and over its bottom $f$. The shaft $g$ of a worm, $h$, is arranged in suitable bearings in this base, with one end projecting through the end of said base next to one of the carriage-wheels, and carrying a six-pronged wheel, $i$, to be shifted one stage at each revolution of the carriage-wheel by a stud, $j$, projecting radially from the inner end of the hub $k$. The worm $h$ turns the unit-wheel $l$ of the recording mechanism, which is fitted to the center stud or shaft, $m$, and turns the long pointer $n$ by said shaft. The pointer $n$ registers the travel of the carriage on the outer scale of the dial $o$, according to the proportions of the gearing, which are to be such that said pointer will make one revolution to the mile, or some other number, as five or ten, according to the aggregate amount that it is desired that the instrument shall record. This wheel $l$ is connected to said shaft $m$ by a ratchet-wheel, $p$, pawl $q$, and a spring, $s$, that allow said wheel to be turned backward without turning the pointers back whenever the carriage may be backed, and it allows of shifting the pointer to reset it. The wheel $l$ carries a cam-stud, $t$, that raises a bell-hammer, $u$, once for each revolution when said wheel makes one revolution per mile, and said hammer strikes a bell, $v$, by the action of a spring, $w$, and thus gives a signal for each mile traveled. In case said wheel $l$ is geared slower to count, say, five miles to one revolution, it will have five cam-studs for the hammer. The second wheel, $x$, of the counter is fitted on a sleeve, $y$, that works on the shaft $m$ and carries the middle pointer, $z$, and the third wheel, $a'$, is fitted on another sleeve, $b'$, working on sleeve $y$, and carries the inner pointer, $c'$.

Between wheel $a'$ and the dial-plate $d'$ there is a coiled spring, $e'$, that presses wheel $a'$ against a stud-pin, $f'$, projecting from the side of wheel $x$, and this wheel is thereby pressed against a stud-pin, $g'$, projecting from an arm or disk, $g^2$, attached to shaft $m$. The wheels thus pressed by the spring against these studs will be held by the frictional contact of the studs, so as to be turned by them when not held by their pawls $h'$ and notches $i'$; but for certainty of being turned, the said wheels may have little cavities $j'$, formed on the side at the points where said studs bear when the wheels are to be turned by them. The pawls $h'\ k'$ and spring $l'$ are carried by the same journaled plate, $x'$, as shown in Fig. 7 of the drawings. The stud $g'$ of the disk $g^2$ lifts the pawl $h'$ of wheel $x$ out of the notches of said wheel once for every revolution by raising the arm $k'$ of said pawl, allowing wheel $x$ to be turned one notch for recording the aggregates of the distance measured by one revolution of wheel $l$. On the middle scale of the dial in like manner the stud $f'$ of wheel $x$ lifts the pawl $h'$ of wheel $a'$ once for every revolution of wheel $x$ by arm $k'$ of said pawl. To allow wheel $a'$ to move one notch and record the aggregate distance measured by one revolution of wheel $x$ on the outer scale of the dial, the springs $l'$ press the pawls $h'$ down into the notches $i'$ after the studs $g'$ and $f'$ escape from the arms $k'$, to stop the wheels $x$ and $a'$ after turning the distance of one notch.

In this example the wheel $l$ is represented as geared to revolve once for each mile of travel by the carriage, and the succeeding wheels to be turned once for every fifteen turns of the preceding wheels, which makes the total capacity of the instrument two hundred and twenty-five numbers with three wheels; but more wheels and pointers may be added, or the capacity of the same number of wheels may be greatly increased by gearing the wheel $l$ to run slower.

Having thus described my invention, I claim as new and desire to secure by Letters Patent—

1. In an odometer, the combination of the saddle-base $b$, adapted to be clipped to the axle, having the screw-shaft $g$, and provided with the pronged wheel $i$, with the cylindrical case $a$, having the counting mechanism, pointers, and dials arranged in it, said counting mechanism being geared with the screw-shaft, as shown and described.

2. The combination, with a vehicle-axle, of a wheel having stud $j$ on its hub $k$, a shaft, $g$, carrying a worm, $h$, and six-pronged wheel $i$, the unit-wheel $l$, carrying a cam-stud, $t$, the shaft $m$, carrying the pointer $n$, the ratchet and pawl $p$ $q$, the hammer $u$, the bell $v$, and the spring $w$, whereby the desired distance will be simultaneously registered and announced, as described.

3. The combination, in a counting mechanism for odometers, of the unit-wheel $l$, tripping and driving stud $g'$, and an adding-wheel, $x$, said wheel having notches $i'$ and a holding-pawl, $h'$, and said pawl having an arm, $k'$, for being lifted by the stud $g'$, and a spring, $l'$, to return the pawl into the notches of said wheel, substantially as described.

4. The combination, with the pointer-shaft $m$, carrying disk $g^2$, the sleeves $b'$ $y$, carrying pointers $c'$ $z$, the wheels $a'$ $x$, of which the latter has a stud-pin, $f'$, and the coil-spring $e'$, as and for the purpose set forth.

5. The combination, with the wheels $a'$ $x$, having the side cavities, $j'$, and the spring-pawls $h'$, of the disk $g^2$, having stud-pin $g'$, the wheel $x$ being also provided with a stud-pin, $f'$, as and for the purpose specified.

JAMES GILLESPIE.

Witnesses:
GEORGE W. DURBIN,
WESLEY GRATE.